United States Patent [19]
Schmidt et al.

[11] Patent Number: 5,485,986
[45] Date of Patent: Jan. 23, 1996

[54] FURNACE WITH IN SITU FOAMED INSULATION AND PROCESS FOR ITS MANUFACTURE

[75] Inventors: Günther Schmidt, Waldbröl; Peter Randel, Langenfeld; Hans-Werner Engels, Troisdorf; Bernd Geick, Eitorf, all of Germany

[73] Assignee: Huls Troisdorf AG, Troisdorf, Germany

[21] Appl. No.: 193,184

[22] PCT Filed: Aug. 12, 1992

[86] PCT No.: PCT/EP92/01826

§ 371 Date: Jun. 2, 1994

§ 102(e) Date: Jun. 2, 1994

[87] PCT Pub. No.: WO93/04010

PCT Pub. Date: Mar. 4, 1993

[30] Foreign Application Priority Data

Aug. 12, 1991 [DE] Germany .......... 41 26 628.5

[51] Int. Cl.[6] ............................................. C21B 7/04
[52] U.S. Cl. .......................... 266/280; 266/286; 264/30
[58] Field of Search .................................. 266/280, 281, 266/286, 44, 275; 264/30

[56] References Cited

FOREIGN PATENT DOCUMENTS

| | | |
|---|---|---|
| 0364668 | 4/1990 | European Pat. Off. . |
| 0399786 | 11/1990 | European Pat. Off. . |
| 0417583 | 3/1991 | European Pat. Off. . |
| 2296485 | 7/1976 | France . |
| 3512588 | 10/1986 | Germany . |
| 4020297 | 1/1991 | Germany . |
| 9101866.8 | 5/1991 | Germany . |
| WO89/05285 | 6/1989 | WIPO . |

*Primary Examiner*—Scott Kastler
*Attorney, Agent, or Firm*—Millen, White, Zelano & Branigan

[57] ABSTRACT

The invention relates to a furnace having an inner wall, an outer wall and a heat insulation arranged in between. The heat insulation is foamed up in situ, and hardened, from a mass which contains,

- per 100 parts by weight of a reactive solid (stone-forming component),
- 40–250 parts by weight of a water-containing hardener which effects the hardening reaction of the reactive solid (stone-forming component) in the alkaline region,
- 40–250 parts by weight of fillers and a blowing agent.

The reactive solid used is preferably a reactive solid from the group comprising I finely dispersed oxide mixture containing amorphous silica and alumina, II a glassy, amorphous electrostatic precipitator ash, III ground calcined bauxite, IV electrostatic precipitator ash from lignite-fired power stations, V undissolved, amorphous $SiO_2$, especially from an amorphous, disperse-pulverulent, dehydrated or water-containing silica or from high-temperature processes (silica fume), and VI metakaolin.

25 Claims, 1 Drawing Sheet

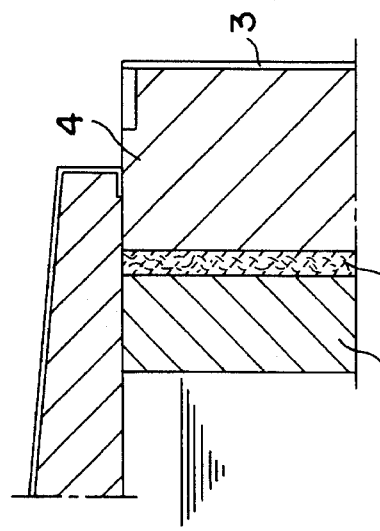
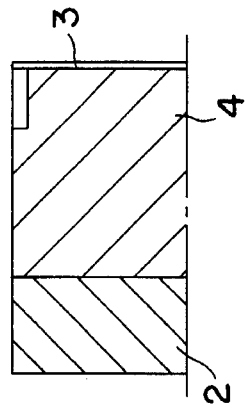
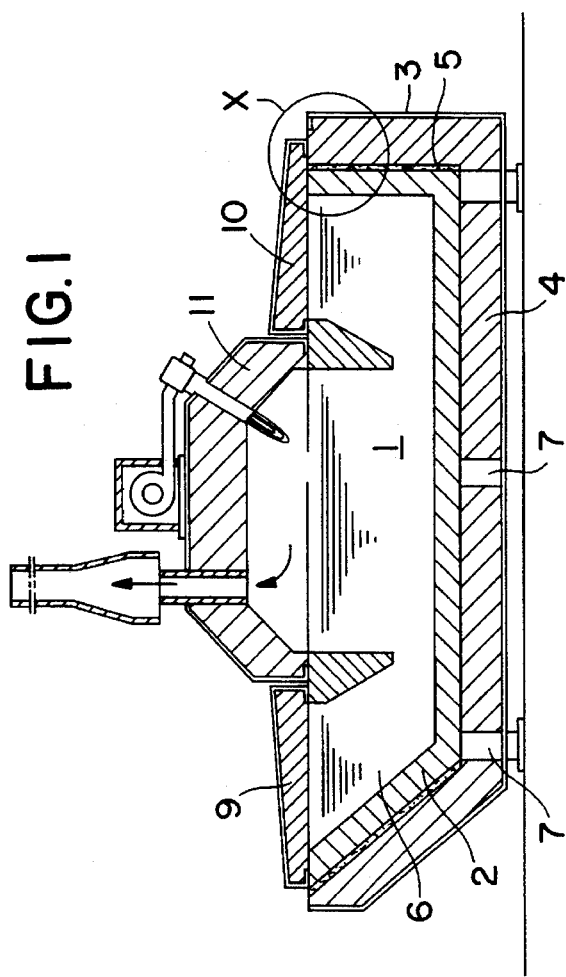
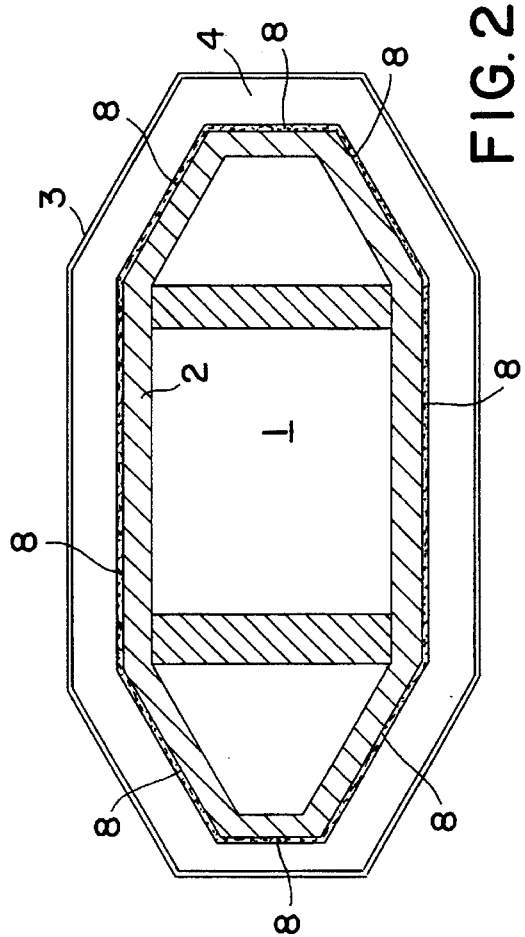

FURNACE WITH IN SITU FOAMED INSULATION AND PROCESS FOR ITS MANUFACTURE

TECHNICAL FIELD

The invention relates to a furnace having an inner wall, an outer wall and a heat insulation arranged between the inner wall and the outer wall, to a process for the manufacture of a furnace and to the use of an inorganic foam, which is foamed up, and hardened, from an inorganic hardenable mass, for the insulation of furnaces and as a front material in melting furnaces, holding furnaces and dosing furnaces and for the lining and coating of furnace accessories.

The invention relates in particular to furnaces for molten metals, such as holding furnaces, dosing furnaces and melting furnaces, especially in the field of non-ferrous metals.

Metal-melting furnaces and other furnaces both in the molten-metal field and in the heating and burner field require a highly effective and temperature-resistant insulation. This is necessary for both process engineering reasons and energy-saving reasons.

STATE OF THE ART

In a conventional process for the manufacture of furnaces for molten metals, such as holding furnaces, dosing furnaces and melting furnaces, an outer trough of steel is first made, which is lined on the inside with several successively overlapping layers of insulating panels or mats of, for example, ceramic fibers.

After the insulation has been introduced, internal formwork is inserted to form a space. Into this space between the fiber panel insulation and the inner formwork, a refractory concrete is then cast which, after hardening, represents the inner wall of the furnace.

This application of, for example, insulating fiber panels is extremely labor-intensive, since the fiber panels must, because of the relatively complicated geometry of the furnaces, in each case be cut exactly to size, fitted in and fixed by hand. In practice, not infrequently more than 50% of the total manufacturing costs of such a furnace are represented by this insulation.

Undesired crevices and gaps here also always remain, whereby, on the one hand, the strength of the insulating layer is adversely affected and, on the other hand, thermal bridges are formed which, in addition to the energy losses, can also lead to damage to the furnace structure and, in the event of an escape of molten metal, to accidents.

A further disadvantage of the known furnaces is that, in the event of a crack or other damage to the inner wall, molten metal can pass into the insulation layer, the latter frequently being completely penetrated by the molten metal and hence being made useless. A repair is possible only by complete replacement of the entire insulation and inner wall.

The casting of insulating concrete or other masses is also known. These solutions are very involved from the point of view of processing and very expensive from the point of view of the material. In addition, damage to health can occur during processing.

OBJECT OF THE INVENTION

The invention is based on the object of providing a furnace having thermal insulation arranged between an inner wall and an outer wall, wherein the thermal insulation can be produced simply and inexpensively, has a high strength and avoids the formation of thermal bridges.

A further object of the invention is to provide a furnace for molten metals, having thermal insulation which is resistant to and secure against penetration by liquid molten metals.

Finally, it is a further object of the invention to provide a material for the thermal insulation of metal furnaces, which, in addition to the insulation of the furnace trough, is also suitable able for insulating furnace accessories, such as hoods, covers, lids, runners, stacks, etc.

DESCRIPTION OF THE INVENTION

The essential feature of the invention is that the thermal insulation is foamed up and hardened in situ, that is to say directly in the furnace location which is to be insulated. According to a preferred process for the manufacture of a furnace, the outer wall, for example of steel and the inner wall are first produced-separately in the known manner. The inner wall can be erected in a manner known to those skilled in the art by the casting process, ramming process or spraying process from refractory concrete or other refractory masses or by laying of refractory bricks. In principle, the inner trough can also be produced in another way known to those skilled in the art, for example from ceramic panels which are screwed to one another and sealed against one another. The finished hardened and preferably heat-treated inner wall is then placed into the outer wall in such a way that, between the outer wall and the inner wall, a space remains which corresponds to the desired thickness of the insulation. A mixture of reactive solid, water-containing alkaline hardener, fillers and blowing agent is then cast into this space, only about 10 to 30% by volume being required, depending on the set foaming factor (a property of the blowing agent). If necessary, the furnace can be slightly heated during this (at most to about 50° to 80° C.), in order to accelerate hardening. As a rule, however, this can be carried out at room temperature since, due to the decomposition of the foaming agent (preferably $H_2O_2$) and due to the exothermic reaction of the mass, sufficient heat is released for heating the foamed mass to about 60° to 90° C. and to harden it within 0.5 to 5 hours.

Due to the thermal insulation being provided by the use of inorganic foam, which is foamed up and hardened from an inorganic hardenable mass in situ, a coherent, continuous and therefore relatively solid insulation layer, which prevents the formation of thermal bridges, is formed. The filling of the cavities with the inorganic hardenable mass and/or the application to the surfaces which are to be insulated requires only a small effort. The inorganic foamable and hardenable masses, used according to the invention, are known in principle, see, for example, DE-C2 3,512,515, WO89/05, 783, EP-A2 0,199,941 and EP-B10,148,280, but it was not be expected that they are suitable for the in-situ insulation of furnaces.

Surprisingly, it has been found that the foamable and hardenable mass used according to the invention is, in the hardened state, absolutely resistant and leaktight against molten metals. Thus, the insulating effect is not impaired even in the event of a leak in the inner furnace wall.

The foam has a good insulating action, is light, inexpensive and not injurious to health in the fully reacted state. Broken-out material does not have to be stored in landfill sites for hazardous waste. The foam is resistant to many substances and, depending on the composition, has a temperature resistance of up to 1200° C.

Preferred formulations for the foamable mass, described below, are available as a commercial product under the name TROLIT®hardener and/or TROLIT®solid from Hüls Troisdorf AG.

The mass required for the manufacture of a furnace, in which the insulation is arranged between an inner wall and an outer wall, which mass is foamed up, and hardened, to give a non-combustible foamed material with an increase in volume, is prepared either by hand or by machine by mixing of the components. Per 100 parts by weight of a reactive solid (stone-forming component), the mass contains 40 to 250 parts by weight of a water-containing hardener which causes the hardening reaction of the reactive solid in the alkaline region, 40 to 250 parts by weight of fillers and a blowing agent. The mass is filled into the cavities, which are to be insulated, of the furnace or between the inner wall and the outer wall, and it foams up due to the onset of the chemical reaction, with a considerable increase in volume, whereby the cavities are completely filled. It is impossible for crevices and gaps to remain. The mass then fully hardens in an exothermic reaction.

During the manufacture of furnaces, panels or mats of mineral fibers or ceramic fibres are preferably applied to the inner wall on at least a part area of its surface, before the subsequent foaming in the remaining space or cavity. The fiber panels or fiber mats have a higher elongation at break than the hardened foam, whereby the resistance to thermal shocks is increased and the tendency to crack under thermal cycling is reduced. The hardened inorganic foam has an at least largely closed-cell structure.

The inorganic foam preferentially forms a surface, which is completely closed in itself, with the exception of passages in the walls, between the inner wall and the outer wall of the furnace.

Furnaces with thermal insulation of this type can be manufactured for the most diverse fields of application, in particular for melting furnaces, holding furnaces and dosing-furnaces.

The reactive solids (stone-forming components) present in the inorganic hardenable mass preferably contain one or more reactive solids from the group comprising I finely dispersed oxide mixture containing amorphous silica and alumina, in particular as electrostatic precipitator dust from electrocorundum manufacture, II glassy, amorphous electrostatic precipitator ash, III ground calcined bauxite, IV electrostatic precipitator ash from lignite-fired power stations, V undissolved, amorphous silica ($SiO_2$), especially from an amorphous, dispersed-pulverized, dehydrated or water-containing silica or from high-temperature processes (silica fume) and VI metakaolin.

The water-containing hardener present in the inorganic hardenable mass for forming inorganic foam is preferably an alkali silicate solution with 1.2 to 2.5 tool of $SiO_2$ per mol of $K_2O$ and/or $Na_2O$.

The fillers used in the foamable and hardenable inorganic mass are especially mica and fine-grained talc.

After the foam of the hardenable inorganic mass has been foamed up and hardened, it has a density of from 120 to 350 kg/m$^3$, the desired density being adjustable within relatively wide limits by means of the quantity of blowing agent.

The thermal insulation consisting of the inorganic foam is suitable not only for use in furnaces, but also for the accessories thereof. Examples of furnace installations concerned are furnace installations for foundries for the metal treatment of solid and molten metals, in particular melting furnaces for Al, Zn, grey cast iron arid cast steel, holding furnaces and dosing furnaces for molten metals, the inorganic foam being impervious to and resistant to the molten metal, or furnace installations for recycling processes, such as chip drying, sand regeneration, incineration furnaces (epoxilites) and for thermal afterburning.

The furnace installation accessories, which are lined or coated with the inorganic foam, are, for example, hoods, covers, lids, runners, doors and stacks as well as transport ladles for molten metal and preheating equipment.

The foam serves not only as an insulation against heat loss, but also at the same time as sound insulation.

BRIEF DESCRIPTION OF THE DRAWINGS

The invention is explained in more detail below by reference to an illustrative example and to the drawing, in which:

FIG. 1 shows a vertical section of a furnace, manufactured according to the invention, for molten metals, FIG. 2 shows a horizontal section of a furnace, manufactured according to the invention, for molten metals, FIG. 3 shows detail X according to FIG. 1, and FIG. 4 shows detail X according to FIG. 1 according to an alternative embodiment of the invention.

PREFERRED EMBODIMENT OF THE INVENTION

To manufacture a bale-out holding furnace 1 for aluminium, having a capacity of 750 kg of molten metal 6, the outer wall 3 is made first from 5 mm thick steel sheet.

In parallel thereto, the inner wall 2 is cast from refractory concrete in a wall thickness of 100 mm and heat-treated for 5 to 7 days at 700° C. This self-supporting trough is then pre-insulated over the full area of the side surfaces 8 with 30 mm thick insulating panels 5 of ceramic fibers (detail X, FIG. 3).

A few bottom supports 7 of 220 mm height are placed into the outer trough of steel sheet (outer wall 3), onto which the inner trough is subsequently placed, a distance of 220 mm between the inner wall 2 and the outer wall 3 remaining in each case.

The following charge is selected for the foamable and hardenable mass:

Reactive solid: TROLIT®reactive material of ROS type (filter dust from an electrostatic precipitator purification of the waste gas from an electric melting furnace for the manufacture of electrocorundum; this contains a finely dispersed oxide mixture with contents of amorphous silica and alumina).

b) Filler: 65.5% by weight of fine-grained talc

33% by weight of magnesium mica (phlogopite)

1.5% by weight of alkali-resistant glass fibers.

c) Hardener: TROLIT® hardener, AOS type (51.4% by weight of water, 25.5% by weight of dissolved $SiO_2$, 23.1=1 % by weight of $K_2O$).

d) Foaming agent: 10% by weight $H_2O_2$

The total charge consists of

22% by weight of reactive solid

34% by weight of filler

36% by weight of hardener

8% by weight of foaming agent.

The solid, filler and hardener are first mixed homogeneously with one another in an alkali-resistant mixer. The blowing agent is added in controlled quantities only just before the somewhat viscous mass is introduced into the interspace between the inner wall 2 and the outer wall 3. The foaming agent is either continuously mixed in while the mass is being filled into the interspace (combined delivery and metering pump), or the mass is mixed in portions with blowing agent and filled in immediately. The required quantity of the foamable mass is about ¼ to ⅕ of the volume of the interspace which is to be filled, depending on the desired density.

Due to the decomposition of the $H_2O_2$, the mass is foamed up within a few minutes and, after about 10 minutes, completely fills the volume. The exothermic hardening reaction starts after about 20 minutes, accompanied by a noticeable increase in the temperature of the mass, and is largely complete after about 60 minutes. The resulting foam has the following physical properties:

Density: 300 kg/m³

Thermal conductivity at 400° C:0.2 W/m×K at 800° C:0.35 W/m×K

The inorganic foam has fine pores and closed cells, and is absolutely leaktight and resistant to all molten metals.

At a temperature of the molten metal 6 of 750° C., the temperature of the outer wall 3 is at most 60° C.

In FIG. 4, the detail X according to an alternative embodiment of the invention is shown. In this case, the inner wall of refractory concrete is not, as shown in FIG. 3, additionally insulated by an insulating material 5 of ceramic fibers; rather, the thermal insulation 4 consists exclusively of the foamed mass. In this illustrative example, the thickness of the thermal insulation 4 is 350 mm.

It is also shown in FIG. 1 that further components of the furnace, such as the lid 9 for filling with the liquid melt, the rear lid 10 for removing the molten metal, the heating cover 11, the off-gas hood 12 and the sound insulation hood 13 likewise wholly or partially consist of the foam used according to the invention.

We claim:

1. A furnace (1) comprising an inner wall (2), an outer wall (3) and thermal insulation (4) arranged between the inner wall (2) and the outer wall (3), and wherein the thermal insulation (4) comprises an inorganic foam, said foam having been foamed up and hardened in situ from an inorganic hardenable mass, the mass containing, per 100 parts by weight of a reactive solid stone-forming component, 40–250 parts by weight of a alkaline hardener which effects the hardening reaction of the reactive solid stone-forming component 40–250 parts by weight of fillers, and a blowing agent.

2. A furnace according to claim 1, wherein the inner wall (2) is covered, at least on part areas of its surface, by a second inorganic heat-insulating insulation material (5), whose elongation at break is higher than that of the hardened inorganic foam.

3. A furnace according to claim 2 wherein the hardened inorganic foam has an at least largely closed-cell structure.

4. A furnace according to claim 3, wherein the reactive solid stone-forming component contains one or more reactive solids from one or more of the groups consisting of:

I finely dispersed oxide mixture containing amorphous silica and alumina,

II glassy, amorphous electrostatic precipitator ash,

III ground calcined bauxite,

IV electrostatic precipitator ash from lignite-fired power stations,

V undissolved, amorphous $SiO_2$, from an amorphous, dispersed pulverized, dehydrated or water-containing silica or from high-temperature silica fume processes and VI metakaolin.

5. A furnace according to claim 4 wherein the water-containing hardener used is an alkali silicate solution with 1.2 to 2.5 mol of $SiO_2$ per mol of $K_2O$ or $Na_2O$.

6. A furnace according to claim 5 wherein the fillers used in the foamable and hardenable inorganic mass are predominantly mica and fine-grained talc.

7. A furnace according to claim 6, wherein the inorganic foam has a density of 120–350 kg/m³.

8. A furnace according to claim 7 wherein the inorganic foam forms a surface, which is completely closed in itself, with the exception of passages in the walls, between the inner wall (2) and the outer wall (3) of the furnace (1).

9. A furnace according to claim 8 wherein the inorganic foam is impervious to molten metals (6).

10. A furnace according to claims 9, wherein the blowing agent used is hydrogen peroxide.

11. A process for the manufacture of a furnace (1) having an inner wall (2), an outer wall (3) and thermal insulation (4) arranged between the inner wall (2) and the outer wall (3), comprising filling the interspace between the inner wall (2) and the outer wall (3) of the furnace (1), for at least part of its volume, with a foamable and hardenable mass, the mass containing, per 100 parts by weight of a reactive solid stone-forming component, 40–250 parts by weight of a alkaline hardener which effects the hardening reaction of the reactive solid stone-forming component 40–250 parts by weight of fillers, and a blowing agent, and subsequently forming the mass is in situ, so that the foam completely fills the interspace, and hardening the resultant foam.

12. A process according to claim 11, wherein, before filling with the foamable and hardenable mass, panels or mats of mineral fibers or ceramic fibres are applied to the inner wall (2) on at least a part area of its surface.

13. A furnace according to claim 1, wherein the hardened inorganic foam has an at least largely closed-cell structure.

14. A furnace according to claim 1, wherein the reactive solid stone-forming components contains one or more reactive solids from one or more of the groups consisting of I finely dispersed oxide mixture containing amorphous silica and alumina, II glassy, amorphous electrostatic precipitator ash, III ground calcined bauxite, IV electrostatic precipitator ash from lignite-fired power stations, V undissolved, amorphous $SiO_2$, from an amorphous, dispersed pulverized, dehydrated or water-containing silica or from high-temperature silica fume processes and VI metakaolin.

15. A furnace according to claim 1, wherein the water-containing hardener used is an alkali silicate solution with 1.2 to 2.5 mol of $SiO_2$ per mol of $K_2O$ or $Na_2O$.

16. A furnace according to claim 1, wherein the fillers used in the foamable and hardenable inorganic mass are predominantly mica and fine-grained talc.

17. A furnace according to claim 1 wherein the inorganic foam has a density of 120–350 kg/m$^3$.

18. A furnace according to claim 1, wherein the inorganic foam forms a surface, which is completely closed in itself, with the exception of passages in the walls, between the inner wall (2) and the outer wall (3) of the furnace (1).

19. A furnace according to claim 1, wherein the inorganic foam is impervious to molten metals (6).

20. A furnace according to claim 1, wherein the blowing agent used is hydrogen peroxide.

21. A furnace according to claim 1, containing molten metal.

22. A furnace according to claim 1, wherein said inner wall comprises concrete and said outer wall is steel.

23. A furnace according to claim 22, wherein the furnace contains molten metal, and said concrete inner wall has two surfaces, one facing the molten metal, and the other being provided with mats or panels of mineral or ceramic fibers, and wherein said mats or panels have an elongation at break higher than that of the hardened inorganic foam.

24. A furnace according to claim 23, wherein the foamed thermal insulation completely fills the space between the inner wall and the outer wall, thereby eliminating thermal bridges.

25. A process according to claim 11, wherein said furnace comprises a concrete inner wall and a steel outer wall.

* * * * *